July 15, 1958 C. F. HOOPER 2,843,290
PRESSURE RELIEF DEVICE
Filed April 24, 1957 2 Sheets-Sheet 1
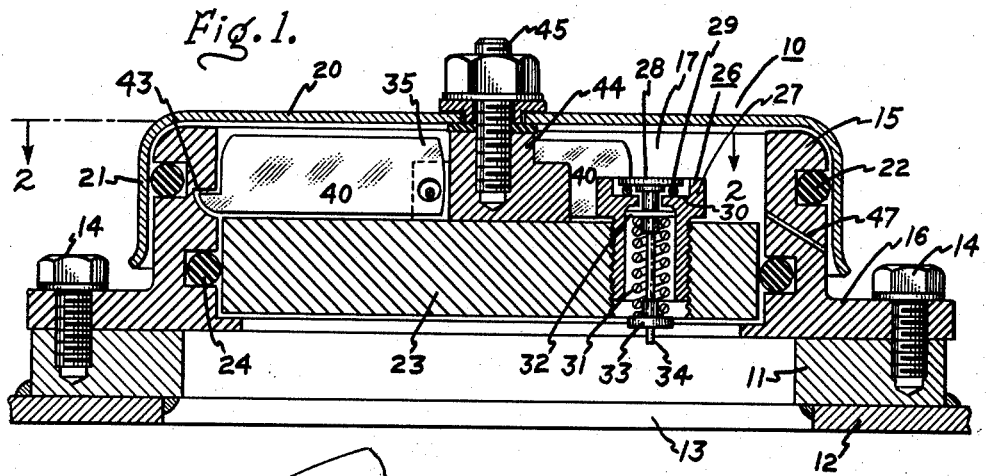
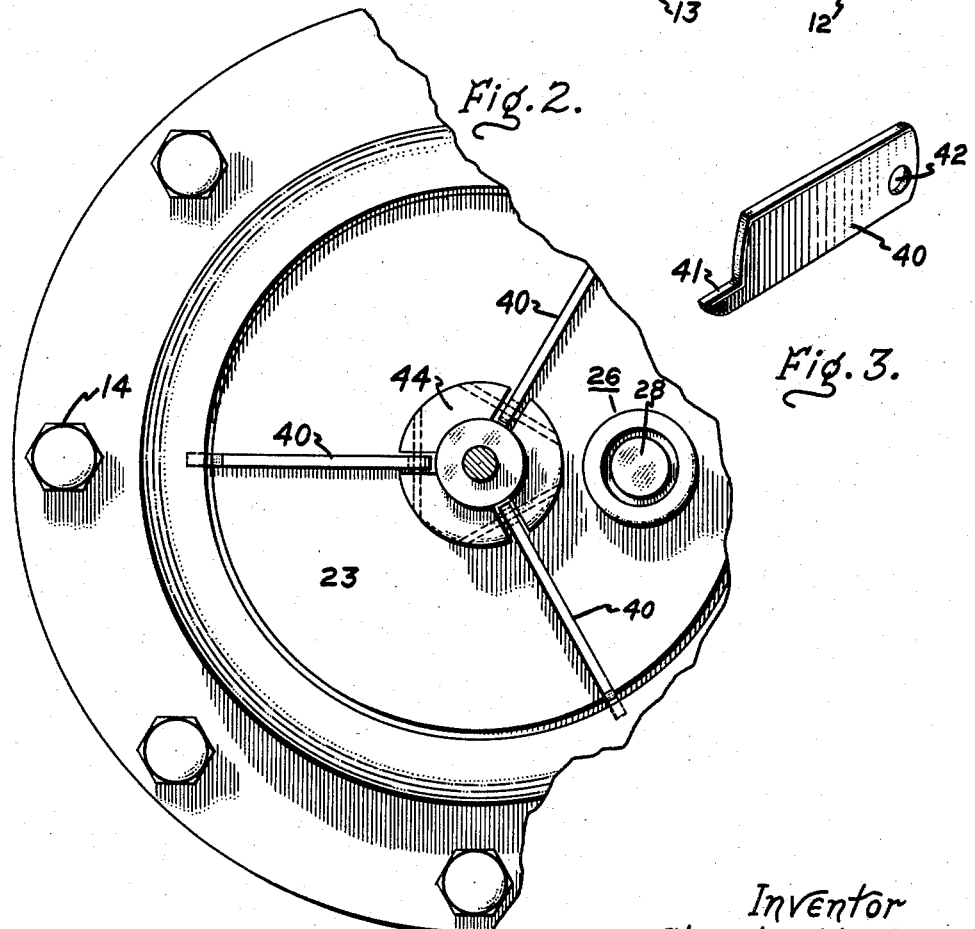
Inventor
Chessley F. Hooper,
by Gilbert P. Tarleton
His Attorney.

July 15, 1958 C. F. HOOPER 2,843,290
PRESSURE RELIEF DEVICE
Filed April 24, 1957 2 Sheets-Sheet 2
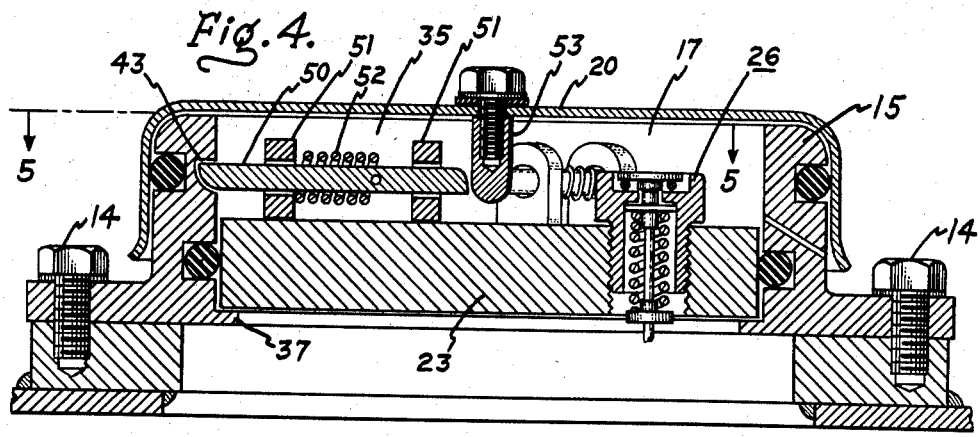
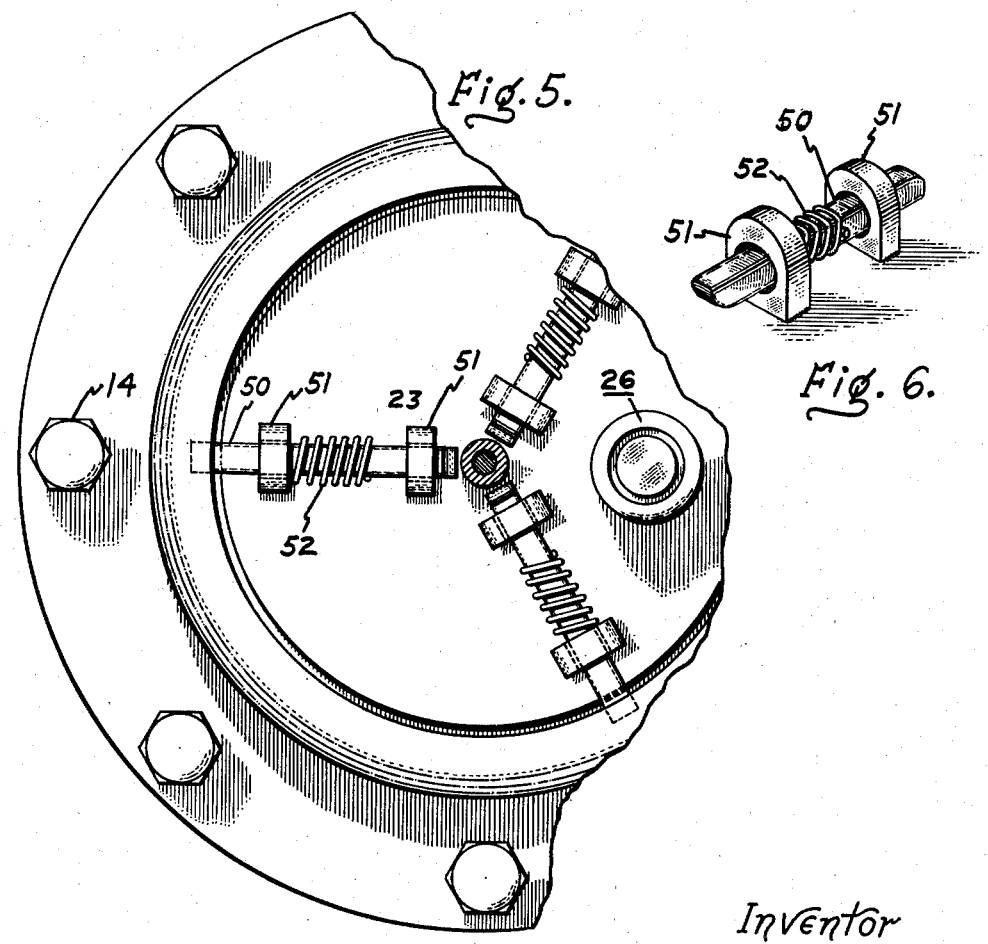
Inventor
Chessley F. Hooper,
by Gilbert P. Tarleton
His Attorney.

United States Patent Office 2,843,290
Patented July 15, 1958

---

2,843,290
PRESSURE RELIEF DEVICE

Chessley F. Hooper, Rome, Ga., assignor to General Electric Company, a corporation of New York Application April 24, 1957, Serial No. 654,859

8 Claims. (Cl. 220—29)

This invention relates to pressure relief devices, and more in particular to an improved pressure relief device adapted especially for the automatic release of excess pressure of enclosed electrical apparatus such as transformers or the like. It will be understood, however, that the invention may also be employed for relieving pressure on other types of enclosures without departing from the spirit or scope thereof.

Totally enclosed electrical apparatus, such as power transformers or the like, are occasionally subjected to high internal pressure resulting from certain fault conditions. In order to prevent structural damage to the equipment, it is desirable to provide means for releasing the internal pressure. In order to provide effective protection for the apparatus, it is necessary that the pressure relief device operate consistently at the same pressure and that the operation is not effected by variable factors such as the gripping of aged gaskets. To insure accurate operation, it is also desirable that a minimum number of components be employed in the device, and that the operation of the device be dependent to a minimum upon friction between moving parts. It is also desirable that the resetting of the relief device involves as simple a procedure as possible.

It is therefore an object of this invention to provide an improved mechanical pressure relief device.

It is also an object to provide an improved pressure relief device characterized by having a minimum of component part, and in which the operation is dependent to a minimum extent upon frictional contact between component parts.

It is a still further object of this invention to provide a pressure relief device in which the potential energy of the fluid is harnessed to effect the release of the pressure release, while the pressure at which the ease is effected takes place is determined by a small low volume device which can be accurately calibrated.

Briefly stated, in accordance with one embodiment of my invention I provide a pressure relief device for covering an aperture in the wall of an enclosure such as a transformer tank. A cover is provided releasably covering the aperture externally of the enclosure. A sealing disk is provided within the aperture, and arranged so that the cover and sealing disk define a chamber within the aperture. Valve means, preferably located in the face of the disk, are provided for admitting fluid under pressure from the enclosure to the chamber, the resultant build-up of pressure in the chamber effecting the release of the cover. The valve means, which may be a small poppet valve, admits the fluid to the chamber only when the pressure in the enclosure is above a predetermined amount. Release means are provided, preferably also within the chamber, for holding the sealing disk in place in the aperture, and the release means is operably connected to the cover so that upon release of the cover the sealing disk is also released, thereby completely opening the aperture to permit the rapid release of fluid from the enclosure.

While the specification concludes with claims particularly pointing out and distinctly claiming the subject matter which I regard as my invention, it is believed that the invention will be better understood from the following description taken in connection with the accompanying drawings.

In the drawings:

Fig. 1 is a cross-sectional view of one embodiment of a pressure relief mechanism according to my invention, Fig. 2 is a partial top view of the pressure relief of Fig. 1 with the cover removed, Fig. 3 is a perspective view of a catch of the pressure relief of Figs. 1 and 2, Fig. 4 is a cross-sectional view of a modification of the pressure relief mechanism of Fig. 1, Fig. 5 is a top view of the pressure relief mechanism of Fig. 4 with the cover removed, and Fig. 6 is a perspective view of the catch mechanism of the pressure relief of Figs. 4 and 5.

Referring now to the drawings, and more in particular to Fig. 1, therein is illustrated a pressure relief device 10 mounted on a flange 11 extending from the wall 12 of an enclosure such as the tank of an electrical apparatus. The flange 11 surrounds an aperture 13 extending through the wall 12 of the apparatus. The pressure relief device 10 is preferably bolted to the flange 11 externally of the enclosure by means of a plurality of bolts 14.

The relief device 10 is comprised of an annular member 15 having a flange 16, the annular member 15 being held against the flange 11 by the bolts 14 which pass through the flange 16. The annular member 15 has a central aperture 17, preferably coaxial with the aperture 13 of the wall 12, the apertures 13 and 17 comprising a common aperture through which fluid and the pressure within the enclosure may escape, as will be disclosed in more detail in the following paragraphs.

A disk-shaped cover 20 having flanged edges 21 is provided over the end of the aperture 17 externally of the enclosure, and the cover is sealed over the aperture by suitable means such as an O ring gasket 22 disposed in an external annular groove in the annular member 15 and contacting the flanged edge 21 of the cover 20. A sealing disk 23 is provided within the aperture 17, and O ring gasket 24 disposed in an internal annular groove in the wall of the annular member 15 provides a seal between the sealing disk 23 and the internal wall of the aperture 17.

A small calibrated valve such as poppet valve 26 is provided extending through the sealing disk 23. As illustrated in Fig. 1, the poppet valve may be comprised of a body member 27 threaded in an aperture in the disk 23. The valve disk 28 is resiliently held against a gasket 29 on valve face 30 of the body member 27 by helical spring 31 extending between a web 32 in the valve body 27 and a fixed collar 33 on the valve shaft 34. The valve 26 is adapted to permit fluid above a predetermined pressure to pass therethrough and into a chamber 35 defined by the cover 20 and the sealing disk 23, and it will be understood that any other suitable form of valve may be employed in place of the valve 26 without departing from the spirit or scope of my invention. It shall also be understood that it is not necessary that the valve 26 be disposed in the sealing disk 23, since the function of the valve is not dependent upon such positioning.

The sealing disk 23 is prevented from passing through the aperture 17 by a flange 37 in the annular member 15. The sealing disk 23 is held against the flange 37 by a plurality of links 40, the links 40, which are illustrated separately in Fig. 3, are provided with notches 41 on one end and apertures 42 on the other end. It is seen in Figs. 1 and 2 the notches 41 engage annular grooves 43 in the wall of aperture 17, and the apertures 42 of links 40 are pivoted in a block 44 rigidly affixed to the cover 20, as by a bolt 45 extending through the cover 20.

While three links 40 are shown in Figs. 1 and 2 for holding the sealing disk 23 within the aperture 17, it will be obvious that any number of such links 40 may be employed without departing from the spirit or scope of the invention. The annular member 15 may also be provided with an orifice 47 extending between the chamber 35 and the external side of the enclosure, the orifice 47 being small in size in order to slowly bleed the pressure from the chamber 35.

Referring now to Figs. 4 and 5, therein is illustrated a pressure relief according to my invention, and having a modified release mechanism. As in the arrangement of Figs. 1–3, the arrangement of Figs. 4 and 5 has an annular member 15 with an aperture 17, the aperture being covered by a cover 20. Similarly, the sealing disk 23 is provided within the aperture 17, and a chamber 35 is defined by the cover and the sealing disk. In this arrangement, the sealing disk 23 is held against the flange 37 by a plurality of bolts 50 slidably mounted in blocks 51 mounted on the face of the sealing disk 23. The bolts 50 are arranged to engage the annular groove 43 in the aperture 17, and are resiliently biased away from the grooves 43 by a spring 52. A projection 53 affixed to the cover 20 extends into contacting relationship with the ends of the bolts 50 to prevent movement of the bolts from the grooves 43 as long as the cover 20 is in place over the aperture 17.

Referring now to Fig. 1, when the pressure within the enclosure exceeds the value for which the valve 26 is set, the valve 26 opens and permits fluid under pressure to enter the chamber 35. The pressure within the chamber 35 exerts an axial force on the cover 20 and effects the movement of the cover away from the aperture. Any seizing or gripping of the gaskets 22 will not affect the movement of the cover 20, since the pressures for which the valve 26 would be set are far in excess of normal frictional forces of the gaskets 22. Upon movement of the cover 20 the links 40 are pivotally disengaged from the groove 33 in the aperture 17, and as a result, the sealing disk 23 is free to be forced from the aperture 17 by the pressure within the enclosure.

In the arrangement of Fig. 4, upon movement of the cover 20, the projection 53 is pulled from contacting relationship with the locking bolts 50 and the springs 52 are free to force the locking bolts from engagement with the grooves 43. The sealing disk 22 is then free to be forced from the aperture 17 by pressure within the enclosure.

The orifice 47 has been provided in order to maintain the pressure in the chamber 35 at substantially atmospheric level to prevent premature operation due to pressure rise within the chamber for any reason other than actual operation of the poppet valve, such as minute leaks around the sealing disk 23. The orifice is of course considerably smaller than the opening provided by the poppet valve.

It will be understood, of course, that, while the forms of the invention herein shown and described constitute preferred embodiments of the invention, it is not intended herein to illustrate all of the possible equivalent forms or ramifications thereof. Thus, it would be well within the scope of one skilled in the art to devise other releasable means for holding the sealing disk within the aperture of the relief device. It will also be understood that the words used are words of description rather than of limitation, and that various changes may be made without departing from the spirit or scope of the invention herein disclosed, and it is aimed in the appended claims to cover all such changes as fall within the true spirit and scope of the invention.

What I claim as new and desire to secure by Letters Patent of the United States is:

1. A pressure relief device for covering an aperture in the wall of an enclosure comprising sealing disk means in said aperture, cover means releasably covering said sealing disk means externally of said enclosure, release means holding said disk means in said aperture, said release means operable upon release of said cover means to release said disk means, said cover means and disk means defining a chamber, and valve means for admitting fluid from said enclosure to said chamber to effect the release of said cover means.

2. A pressure relief device for covering an aperture in the wall of an enclosure comprising sealing disk means in said aperture, cover means releasably covering said sealing disk means externally of said enclosure, release means holding said disk means in said aperture, said cover means and disk means defining a chamber in said aperture, valve means for admitting fluid pressure to said chamber from said enclosure to effect the release of said cover means, said release means being operatively connected to said cover means to effect the release of said disk means upon release of said cover means.

3. A pressure relief device for covering an aperture in the wall of an enclosure comprising sealing disk means in said aperture, cover means releasably covering said sealing disk means externally of said enclosure, said cover means and disk means defining a chamber in said aperture, release means in said chamber holding said disk means in said aperture, valve means in said disk means for admitting fluid above a predetermined pressure to said chamber from said enclosure to effect the release of said cover means, said release being operatively connected to said cover means to effect the release of said disk means upon release of said cover means.

4. A pressure relief device for covering an aperture in the wall of an enclosure comprising sealing disk means disposed in said aperture, cover means releasably covering said sealing disk means externally of said enclosure, said disk means and cover means defining a chamber, catch means holding said disk means in said aperture, valve means in said disk means, and orifice means for releasing pressure in said chamber, said catch means being operatively connected to said cover means to effect the release of said disk means upon release of said cover means.

5. A pressure relief device for covering an aperture in the wall of an enclosure comprising sealing disk means disposed in said aperture, cover means releasably covering said aperture externally of said enclosure, said disk means and cover means comprising a chamber, catch means in said chamber holding said disk means in said aperture, valve means extending through said disk means, orifice means for slowly releasing pressure in said chamber, said cover means being arranged to be released upon the occurrence of a predetermined pressure in said chamber, and release means on said cover means to release said catch means upon release of said cover means.

6. A pressure relief device for covering an aperture in the wall of an enclosure comprising sealing disk means disposed in said aperture, cover means releasably covering said aperture externally of said enclosure, said disk means and cover means defining a chamber in said aperture, valve means in said disk means for admitting fluid above a predetermined pressure to said chamber from said enclosure to effect the release of said cover means, and catch means in said chamber arranged to engage grooves in the wall of said aperture to releasably hold said disk means in said aperture, said catch means being operatively connected to said cover means to effect the release of said disk means upon release of said cover means.

7. The pressure relief device of claim 6 in which the catch means is comprised of a plurality of links having one end pivoted to said cover means and the other end forming a catch engaging said groove in the wall of said aperture.

8. The pressure relief device of claim 6 in which the catch means is comprised of a plurality of bolt means slidably mounted on said disk means, engaging said groove in the wall of said aperture and being resiliently biased away from said groove, and projection means on said cover means restraining movement of said bolt means from said groove.

No references cited.